United States Patent [19]

Maitenaz

[11] 4,292,501

[45] Sep. 29, 1981

[54] PYROLYTIC OVEN WITH A VARIABLE HEATING SPEED

[75] Inventor: Paul Maitenaz, Olivet, France

[73] Assignee: Compagnie Europeenne pour l'Equipement Menager "CEPEM", Paris, France

[21] Appl. No.: 904,967

[22] Filed: May 11, 1978

[30] Foreign Application Priority Data

May 16, 1977 [FR] France ................................ 77 14895

[51] Int. Cl.³ ................................................ H05B 1/02

[52] U.S. Cl. .................................... 219/413; 219/391; 219/399; 422/199

[58] Field of Search ................ 219/391, 393, 396–399, 219/400, 412, 413, 414, 381, 382, 301, 303, 374–376, 501; 422/105, 174, 180, 199; 60/300

[56] References Cited

U.S. PATENT DOCUMENTS

| | | | |
|---|---|---|---|
| 1,839,738 | 1/1932 | Casale | 422/199 |
| 2,900,483 | 8/1959 | Welch | 219/381 |
| 3,364,912 | 1/1968 | Dills et al. | 219/400 |
| 3,413,444 | 11/1968 | Heit | 219/393 |
| 3,451,782 | 6/1969 | Jensen | 422/199 |
| 3,507,627 | 4/1969 | Frant et al. | 219/412 |
| 3,546,435 | 7/1969 | Welch | 219/501 |
| 3,549,862 | 12/1970 | Holtkamp et al. | 219/412 |
| 3,604,896 | 9/1971 | Anderson et al. | 219/413 |

FOREIGN PATENT DOCUMENTS

| | | |
|---|---|---|
| 2623201 | 12/1976 | Fed. Rep. of Germany . |
| 2290120 | 5/1976 | France . |
| 1520908 | 8/1978 | United Kingdom . |

*Primary Examiner*—Gene Z. Rubinson
*Assistant Examiner*—Bernard Roskoski
*Attorney, Agent, or Firm*—Sughrue, Mion, Zinn, Macpeak and Seas

[57] ABSTRACT

A pyrolytically cleaned domestic cooking oven including a catalyst for combustion of the smoke evolved during cleaning, and a temperature sensor placed inside the catalyst and arranged to regulate the heating control of the oven during pyrolytic cleaning.

4 Claims, 6 Drawing Figures

5 8 Rt 2 13 1 13

V C S Rt R U ELECTRONIC REGULATOR Re Tr g G W Co Th

PYROLYTIC OVEN WITH A VARIABLE HEATING SPEED

FIELD OF THE INVENTION

The present invention relates to domestic cooking ovens cleaned by pyrolysis, whether they are independent or form a part of a cooker.

BACKGROUND OF THE INVENTION

These ovens include a catalyst for combustion of the smoke evolved during the cleaning so as to remove its toxic contents, which is mainly carbon monoxide.

To prevent this catalyst from being saturated when the oven is too dirty and thus allowing inadmissable smoke and objectionable odours to spread in the atmosphere of the kitchen, it is known from U.S. Pat. No. 3,413,444 to make the heating of the oven depend, during the cleaning operation, on the temperature of the gases leaving the catalyst by means of a temperature probe placed downstream from the catalyst.

The invention aims to make the heating control device for the cleaning operation more directly dependent on the temperature of the smoke catalyst.

SUMMARY OF THE INVENTION

In accordance with the invention a temperature sensor is placed inside the catalyst and regulates the heating of the oven during cleaning.

This solution is easy to provide in the case where the catalyst is in the form of a block pierced with a multitude of ducts which pass right through it to allow the smoke to pass through with a large contact surface, this being the case for example with palladium oxide which is currently used in this application. The probe is then placed inside one of these ducts.

The advantage of this solution is that it has greater precision and less inertia than the preceding solution since the temperature is detected at the actual place where the exothermic reaction takes place.

However, when a catalyst resistor is necessary to trigger the combustion reaction, the probe must be placed at a point which is protected as much as possible from the direct influence of this resistor so that the temperature of the probe is not greater than that of the catalyst. For the same reason and to prolong the service life of this resistor, it is necessary to turn off its supply as soon as the temperature of the catalyst has exceeded its operating threshold, by using for example the device described in British Pat. No. 1,520,908.

An embodiment of the invention is described by way of a non-limiting example with reference to the accompanying drawings.

DESCRIPTION OF THE PREFERRED EMBODIMENTS

Figure 1:
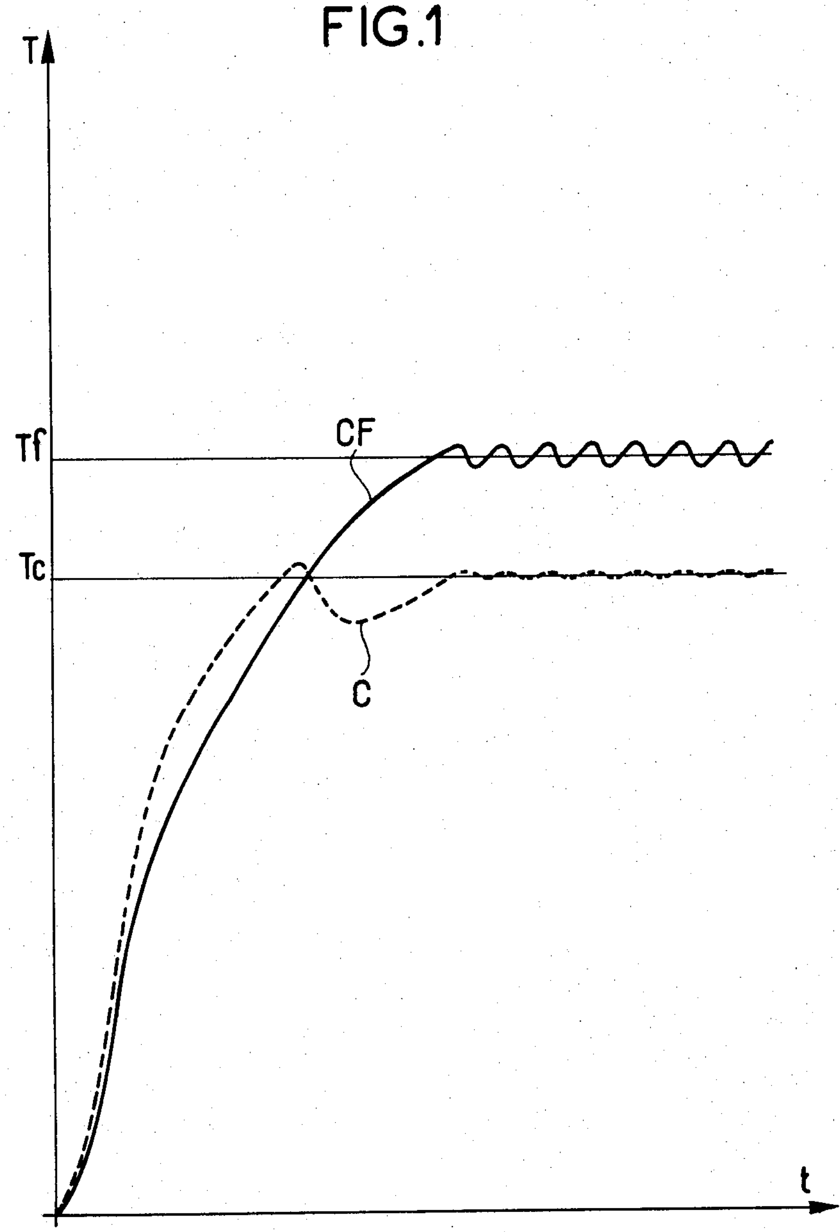
FIGS. 1, 2 and 3 are graphs of the temperature of the catalyst and at the centre of the oven time showing the influence of turning off the oven heating on the temperature of the catalyst.

FIG. 1 shows temperature curves for the centre of the oven and for the catalyst C of a clean oven during heating corresponding to a cleaning operation.

At the beginning of the operation, the temperature of the catalyst slightly exceeds that of the oven centre because of its heating resistor. Then, it is stabilized to a value Tc after this resistor has been taken out of circuit while the temperature of the oven centre is stabilized at a value Tf under the influence of the pyrolysis thermomstat. The difference in temperature is due to the fact that the catalyst which is not thermally insulated cools down quicker than the centre of the oven.

Figure 2:
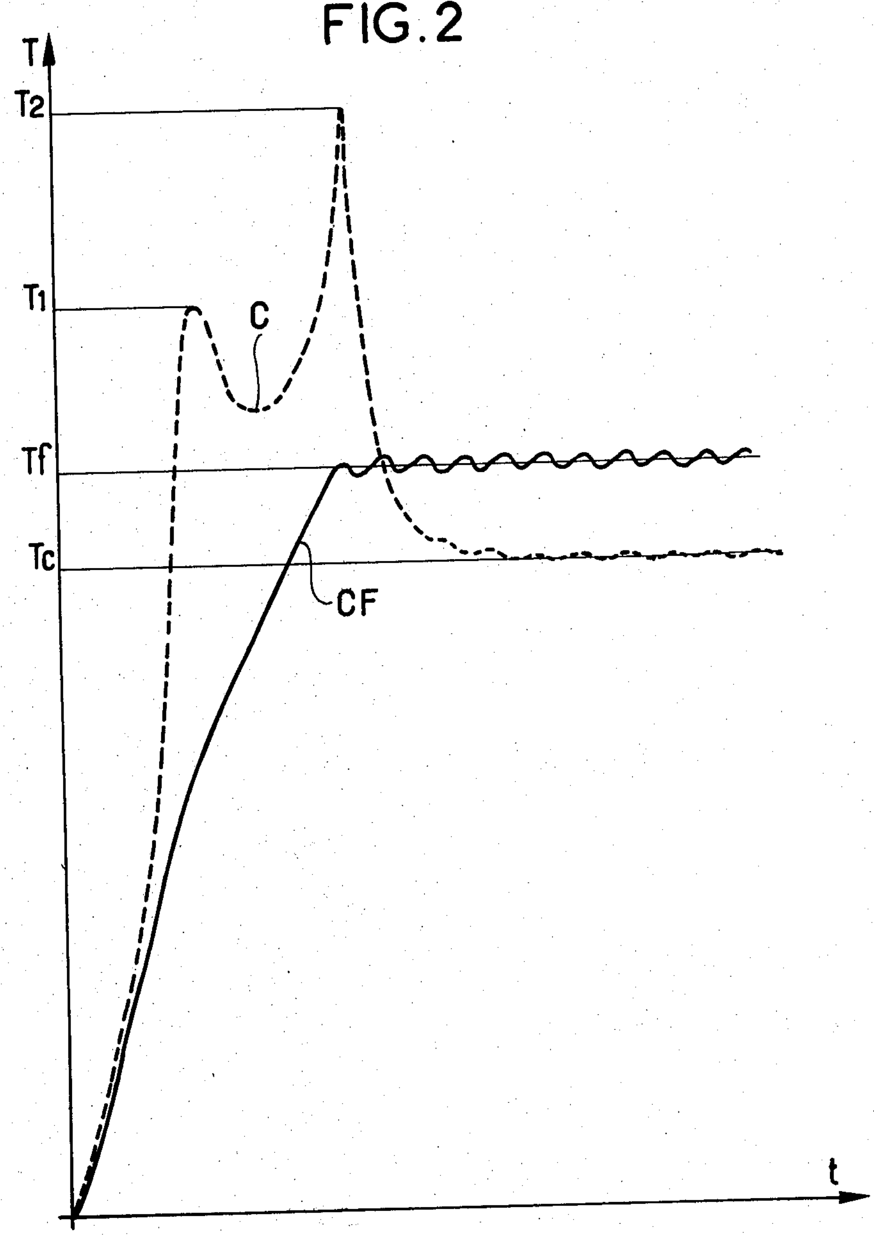

FIG. 2 shows the temperature of the same points during a cleaning operation of the same oven when excessively dirty. The temperature of the catalyst increases very rapidly up to the temperature $T_1$ due to the large amount of smoke obtained initially by distillation of the most volatile products. Then, the excessiveness of the smoke prevents the catalysis from taking place and the catalyst cools down until the discharge of smoke is sufficiently low to allow catalysis to be resumed. The catalyst then reaches the temperature $T_2$ and, since cleaning is almost ended, practically the same temperatures as with the clean oven (Tc and Tf) are very rapidly reached.

Figure 3:
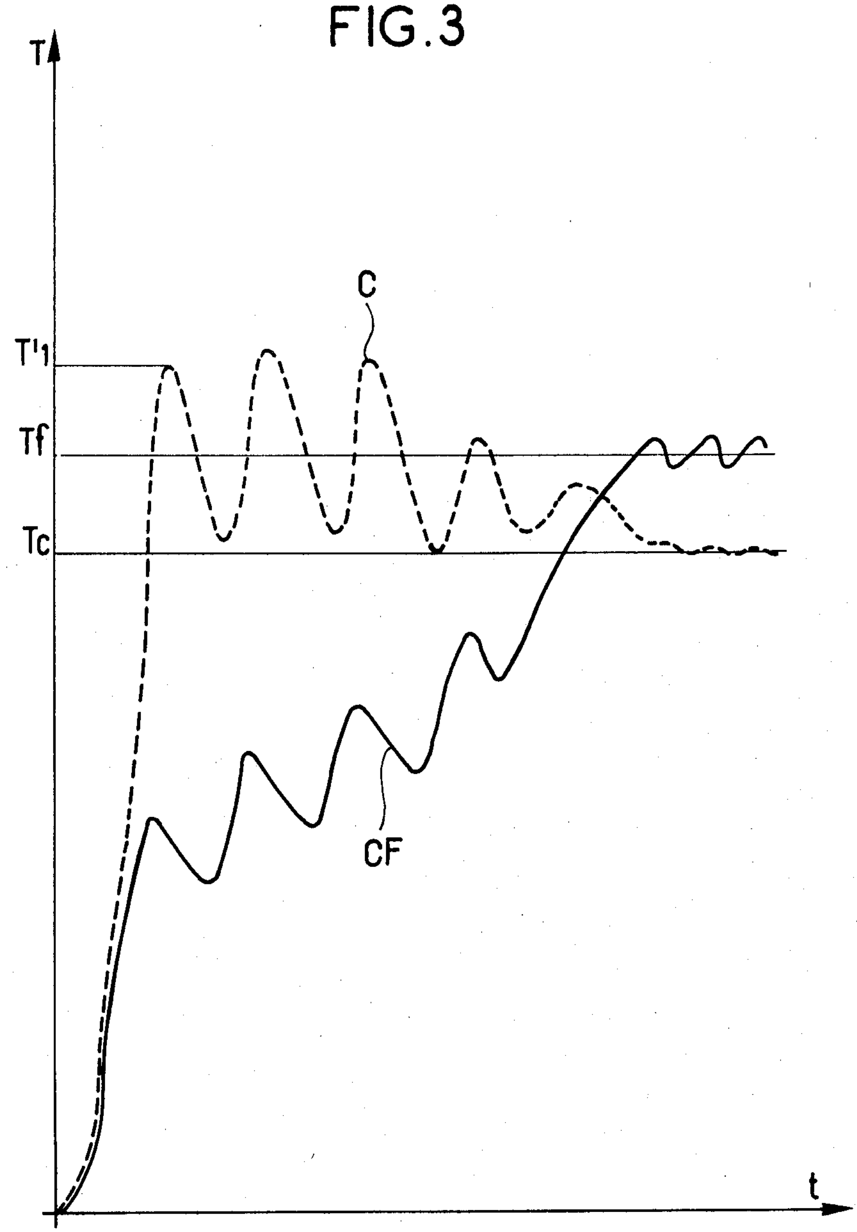

FIG. 3 shows the temperature curves of the same points during the cleaning of the same excessively dirtied oven, whose heating depends on the temperature of a catalyst in accordance with the invention.

The temperature of the catalyst begins to increase as in the preceding case up to $T'_1$ which is below $T_1$; it then decreases when the heating of the oven and of the catalyst is turned off with, however, short delay due to the inertia of the oven and oscillates with large amplitude until cleaning is almost ended; the curves are then as in FIGS. 1 and 2.

The cleaning time is longer than in the preceding case, but taking into account the fact that the heat is turned off, the energy necessary for cleaning is not increased.

Figure 4:
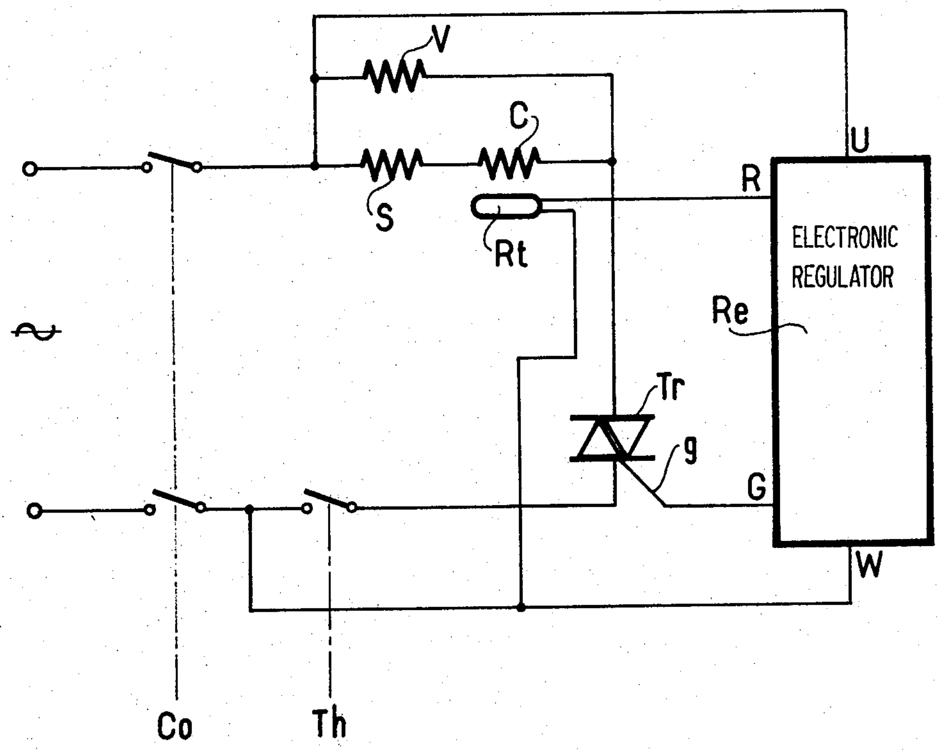
FIG. 4 is an electrical schematic diagram which shows schematically a servo-control arrangement for heating the oven to the temperature of the catalyst in accordance with the invention.

FIG. 4 is a diagram of a device which enables the heating of the oven in the "cleaning" position to depend on the temperature of the catalyst. This device includes a thermistor Rt placed in the catalyst and a symmetrical semiconductor switch, for example a two-way thyristor referred to as a "Triac" connected in series with the heating resistors S of the hearth plate and V of the vault of the oven which are themselves connected in parallel. The Triac Tr is controlled by an electronic regulator Re at its trigger g. The regulator Re advantageously includes an integrated circuit CI (FIG. 5) of known type for triggering thyristors or Triacs to provide electronic power control. It is possible to use, for example, an integrated circuit such as a TCA 280 circuit manufactured by Radio-Technique Compelec connected in a known manner as a temperature regulator. The regulator Re has two supply terminals $U_1$ W connected to the mains via a circuit-breaker Co, an input terminal R connected to the thermistor Rt, which is itself also connected to the terminal W and an output terminal G connected to the trigger g of the Triac Tr.

The current flowing through the thermistor Rt acts on the trigger of the Triac by means of the electronic regulator Re supplied by the mains via the main switch Co of the oven of which only the contacts which are useful for cleaning operations have been shown.

When the temperature of the thermistor exceeds the chosen value, the Triac no longer allows the current to flow through the resistor V (boil element of the oven) nor through the resistor S (oven bake element plate) in series with the resistor C of the catalyst in such a way that taking this resistor out of circuit prevents the bake element plate from heating and consequently prevents pyrolysis from taking place. The pyrolysis thermostat Th in series with the Triac Tr turns off the electricity supply of the oven when the temperature of the oven centre reaches the temperature Tf (of about 510° C.).

The thermostat which short-circuits the resistor C when the temperature of the oven centre has reached a threshold at which the catalyst is hot enough to be effective has not been shown. If the thermistor is not very influenced by this resistor C, the thermostat is dispensible, but when there is no thermostat, the temperature of the catalyst at which the heating of the oven is stopped must be higher and its stabilization temperature can then be higher than that of the oven centre; the service life of the resistor of the catalyst, which depends on its heating time, is thereby reduced.

Figure 5:
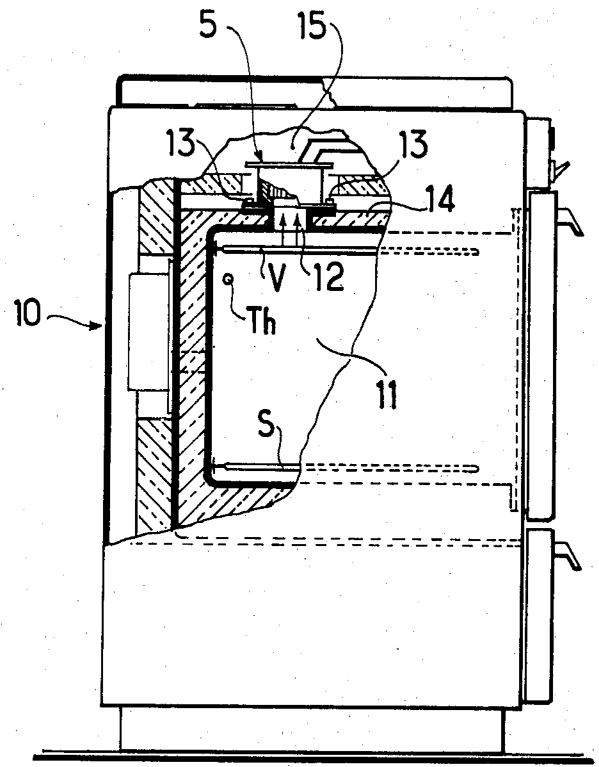
FIG. 5 is a side elevational view of a stove, partially broken away and illustrating the oven which incorporates the several control arrangements for heating the oven to the temperature of the catalyst in accordance with FIG. 4.
Figure 6:
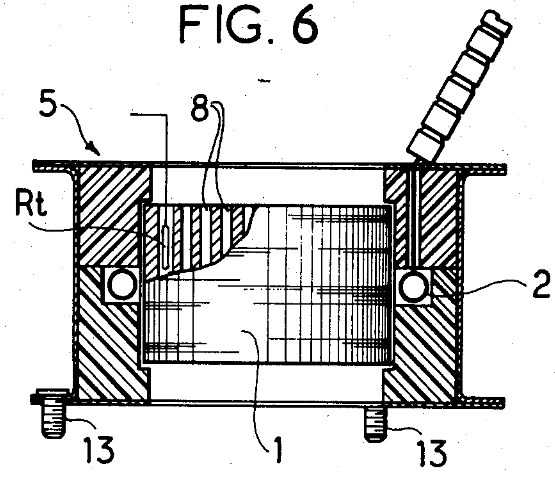
FIG. 6 is an enlarged sectional view of a portion of the stove shown in FIG. 5.

FIG. 5 shows a pyrolytically cleaned domestic cooking oven 10 including a catalyst 5 for combustion of smoke evolved in an oven compartment 11 during cleaning. FIG. 6 is a detailed view of the catalyst 5 of the known type described in British Pat. No. 1,520,908. Catalyst 5 is formed by a block 1 pierced with a multitude of ducts 8 which pass right through it to allow the smoke to pass through and over a large contact surface. A temperature sensor Rt is placed inside one of the ducts of the catalyst in a position where it is protected from the direct influence of the catalyst heating resistor 2. The catalyst 5 is secured by bolts 13 around the outlet 12 of the upper wall 14 of the oven, said outlet 12 being adapted to receive smoke produced in the oven compartment. After upward passage through the catalyst, the smoke passes into a chamber 15 from which it is free to pass into the ambient temperature.

The details of construction of the oven are well known and require no elaboration for an understanding of the invention.

Of course, the preceding description which has been given only by way of a non-limiting example and variants can be envisaged without thereby going beyond the scope of the invention. For example the thermistor Rt can be replaced by an equivalent temperature detector which performs the same function.

What is claimed is:

1. A pyrolytically cleaned domestic cooking oven including: an oven compartment, heating elements for heating the oven during cooking and pyrolytic cleaning, a catalyst for combustion of smoke given off during pyrolytic cleaning, said catalyst formed by a block pierced with a plurality of ducts which pass through said block to allow the smoke to pass over a large contact surface of said block, a temperature sensor positioned inside the body of the catalyst in one of said ducts to generate a temperature signal to regulate the heating control of the oven during pyrolytic cleaning, an electronic control connected in series with the oven heating elements, an electronic regulator connected to said temperature sensor to control said electronic control, a thermostat placed in series with the electronic control in order to regulate the maximum temperature of pyrolytic cleaning, and wherein said catalyst includes a heating resistor and said temperature sensor is placed in a position where it is protected from the direct influence of said catalyst heating resistor.

2. A pyrolytically cleaned domestic cooking oven including; an oven compartment, heating elements for heating the oven during pyrolytic cleaning, a catalyst for combustion of smoke given off during pyrolytic cleaning, said catalyst formed by a block pierced with a multitude of ducts which pass through said block to allow the smoke to pass over a large contact surface of said block, a temperature sensor placed inside one of the ducts of the catalyst in order to generate a temperature signal to regulate control of the oven heating during pyrolytic cleaning, a two-way thyristor connected in series with the heating elements of the oven, an electronic regulator connecting the temperature sensor to said two-way thyristor, and a thermostat to control the maximum temperature of pyrolytic cleaning placed in series with the two-way thyristor, said catalyst including a heating resistor, said temperature sensor being positioned in said catalyst where it is protected from the direct influence of said heating resistor.

3. An oven according to claim 1 wherein the electronic control comprises a symmetric semiconductor having a trigger connected to the electronic regulator.

4. An oven according to claim 1, wherein the electronic regulator comprises a temperature regulator with an integrated triggering circuit.

* * * * *